Figure 1:
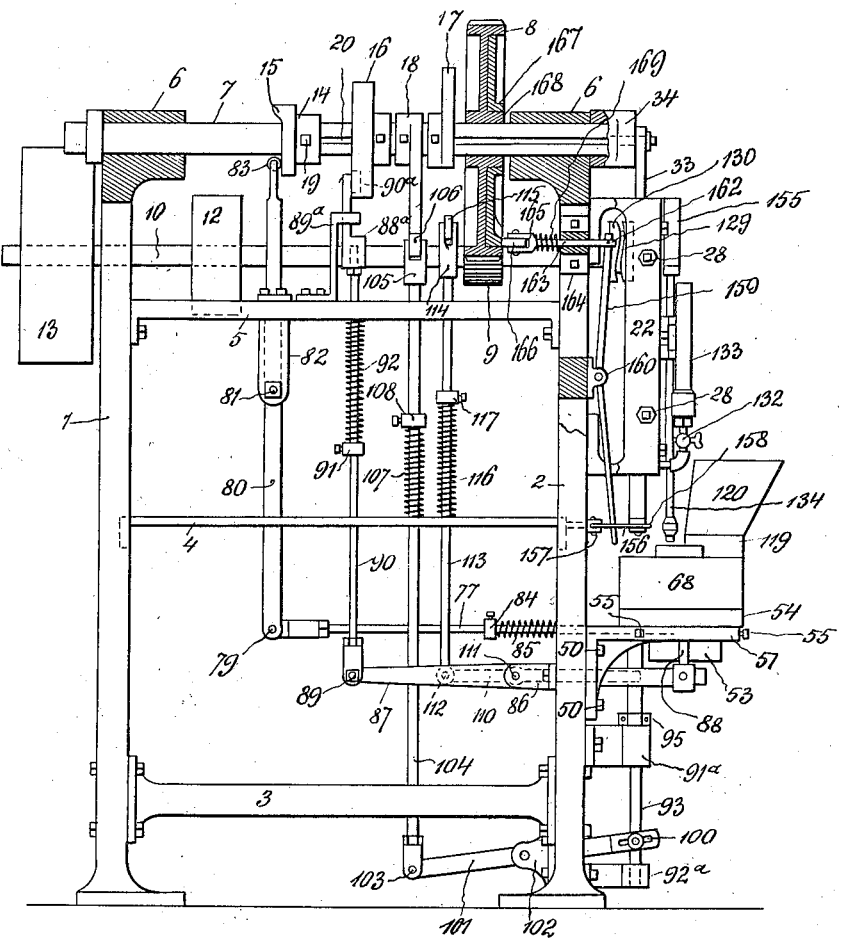

T. T. McCANN.
INSULATOR PRESSING MACHINE.
APPLICATION FILED NOV. 3, 1908.

934,930.

Patented Sept. 21, 1909.
7 SHEETS—SHEET 1.

Witnesses
A.H. Ruthsig,
K.H. Butler

Inventor
T.T. McCann
By H.C. Evert
Attorneys

T. T. McCANN.
INSULATOR PRESSING MACHINE.
APPLICATION FILED NOV. 3, 1908.
934,930.
Patented Sept. 21, 1909.
7 SHEETS—SHEET 2.
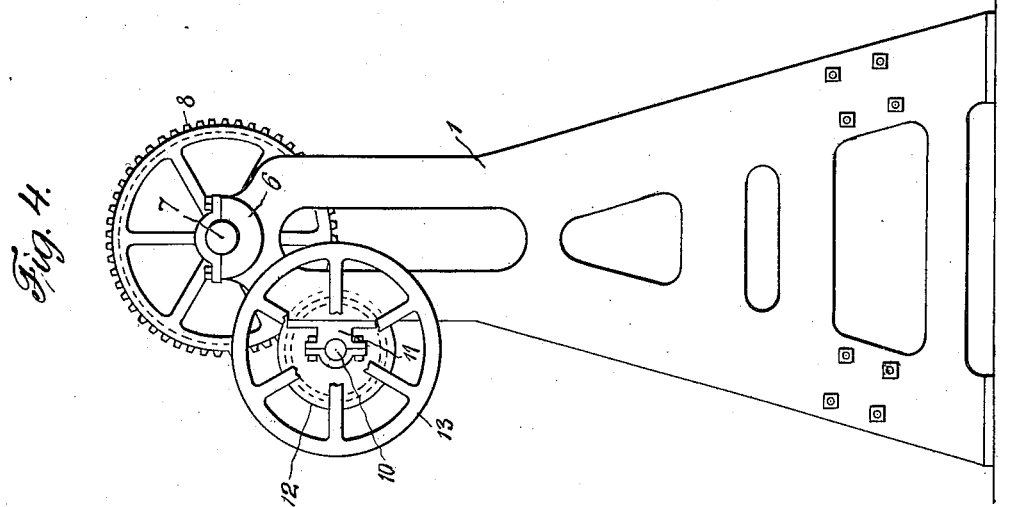
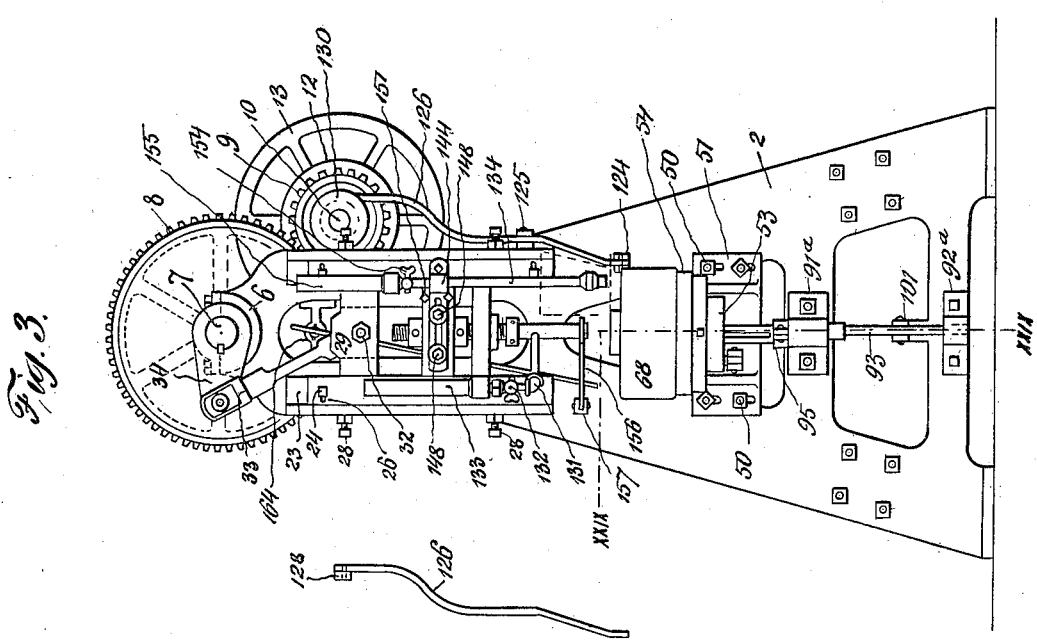
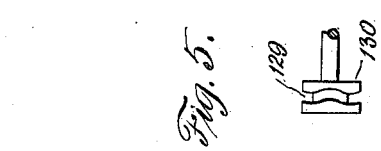
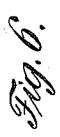
Witnesses
A.H Rabsag,
R.H. Butler
Inventor
T.T. McCann
By H.C. Evert & Co.
Attorneys

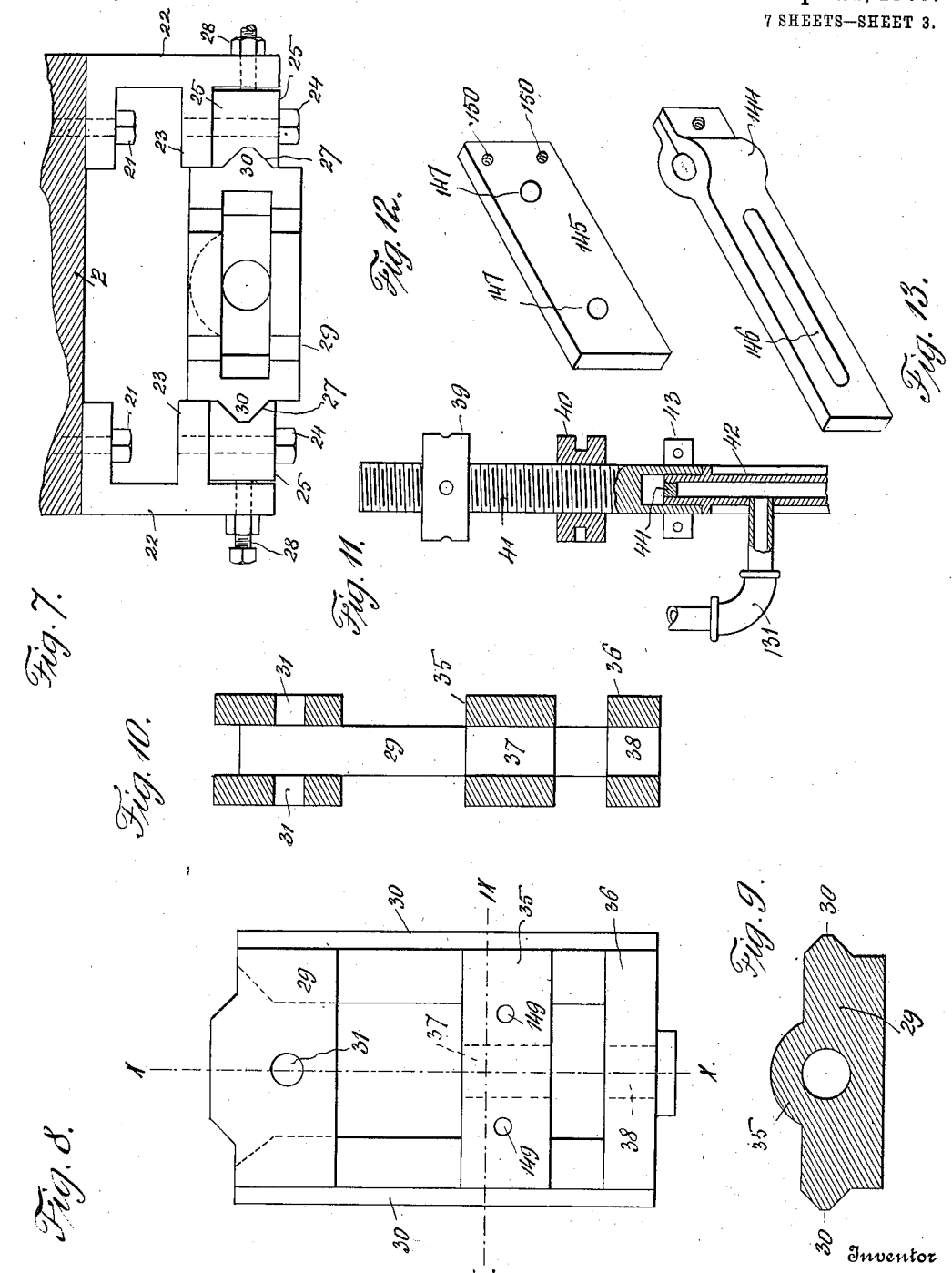

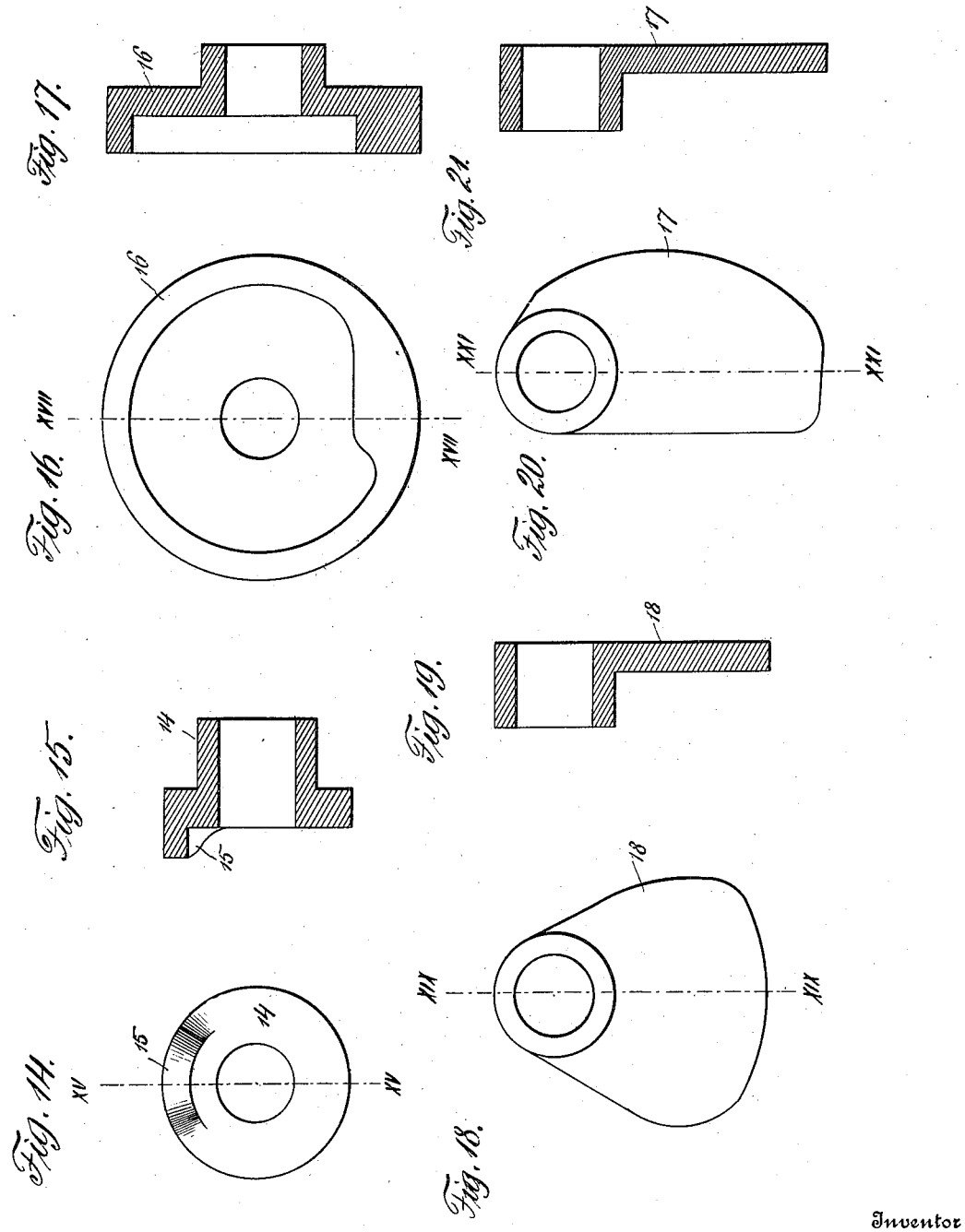

T. T. McCANN.
INSULATOR PRESSING MACHINE.
APPLICATION FILED NOV. 3, 1908.
934,930.
Patented Sept. 21, 1909.
7 SHEETS—SHEET 5.
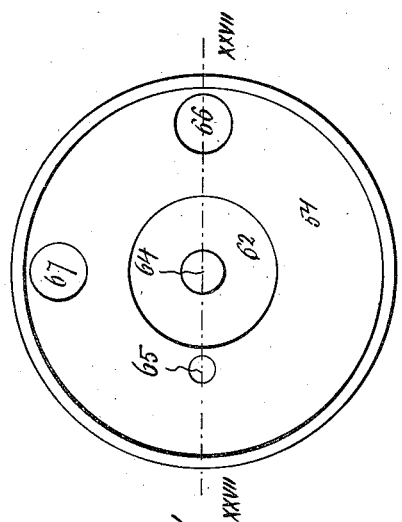
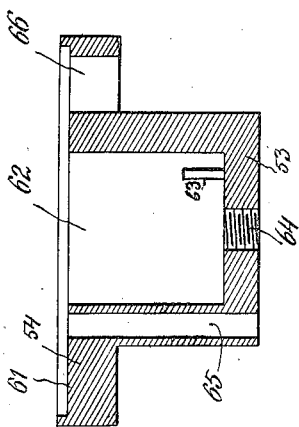
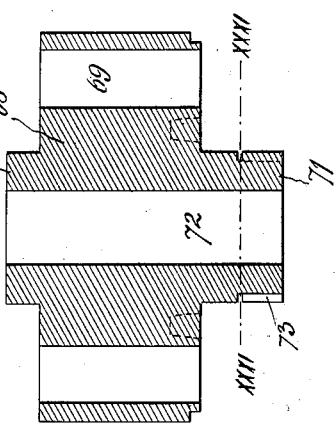
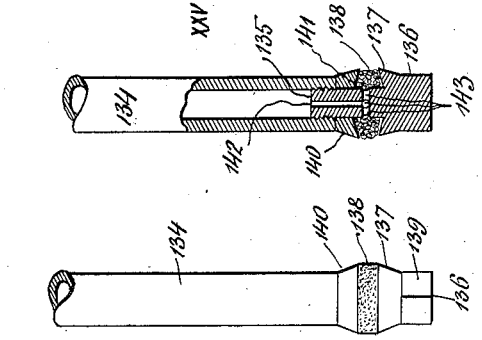
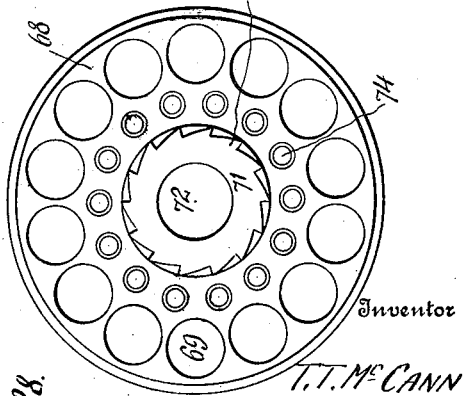

T. T. McCANN.
INSULATOR PRESSING MACHINE.
APPLICATION FILED NOV. 3, 1908.

934,930.

Patented Sept. 21, 1909.
7 SHEETS—SHEET 6.

Witnesses
A. H. Rabsag,
R. H. Butler

Inventor
T. T. McCANN
By H. C. Everitt
Attorneys

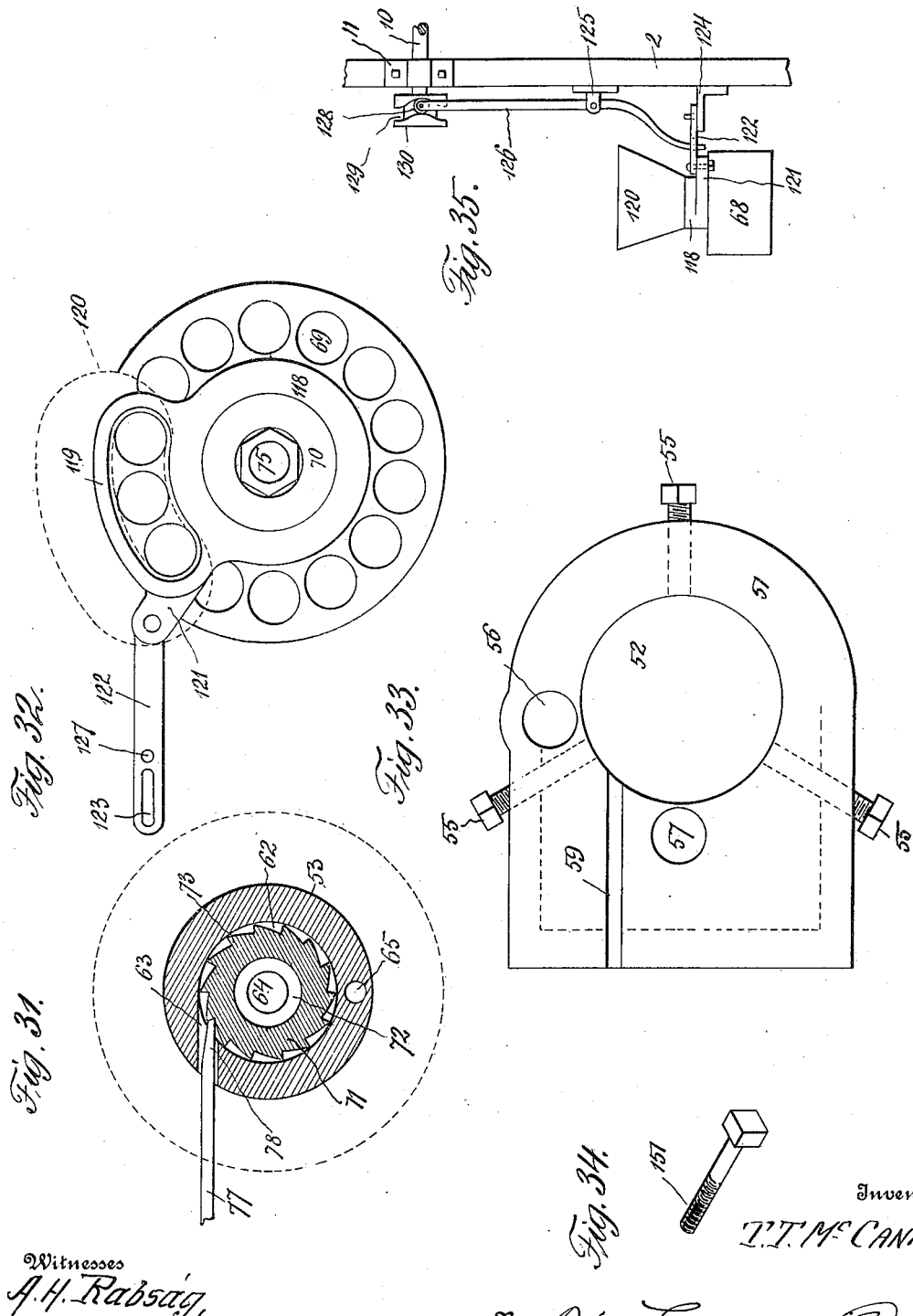

UNITED STATES PATENT OFFICE.

THOMAS TUCKER McCANN, OF EAST LIVERPOOL, OHIO.

INSULATOR-PRESSING MACHINE.

934,930.

Specification of Letters Patent.   Patented Sept. 21, 1909.

Application filed November 3, 1908.   Serial No. 460,950.

*To all whom it may concern:*

Be it known that I, THOMAS TUCKER McCANN, a citizen of the United States of America, residing at East Liverpool, in the county of Columbiana and State of Ohio, have invented certain new and useful Improvements in Insulator-Pressing Machines, of which the following is a specification, reference being had therein to the accompanying drawing.

This invention relates to insulator pressing machines, and more particularly to that type of machine wherein a batch of plastic material is gathered into a mold and acted upon by dies to shape the plastic material in the form of an insulator.

The primary object of my machine is to provide a novel machine for expeditiously forming insulators from the plastic material, the machine embodying a magazine mold in which insulators are successively molded and ejected, ready to be burned, to produce a finished article.

Another object of my invention is to provide a machine for producing that type of insulators commonly made of porcelain or a similar composition that serves as a non-conductor for an electric current, this type of insulator being commonly used for supporting electric light and telephone wires. To this end, I have devised a machine embodying various instrumentalities which operate to produce a perfect molded insulator, and before describing the construction and operation of these instrumentalities, it is proper to describe the general organization to which, in the construction of my machine I prefer to resort.

Primarily there are upright frames suitably connected together. One of these frames serves as the front of the machine, and is provided with a housing for a reciprocating head carrying the upper die of the machine. The frame also supports an adjustable bracket upon which is located an intermittently moving magazine mold, and in conjunction with this mold a lower die is used that coöperates with the upper die for shaping the plastic material within the mold. In conjunction with the upper die and the magazine mold, there are used novel oiling devices for preventing plastic material from adhering to the mold or die.

Associated with the foregoing instrumentalities, there is a novel hopper and agitator by which plastic material is placed in the magazine mold. All of these devices are operated in their order by a simple actuating mechanism carried by the frame of the machine.

Figure 2:
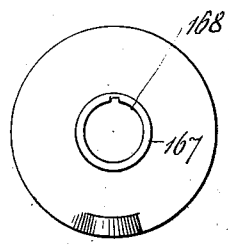
Figure 29:
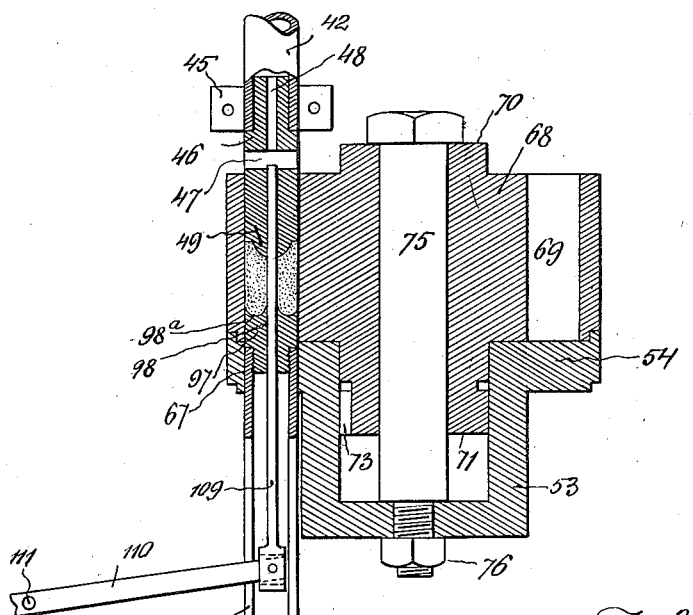
Figure 30:
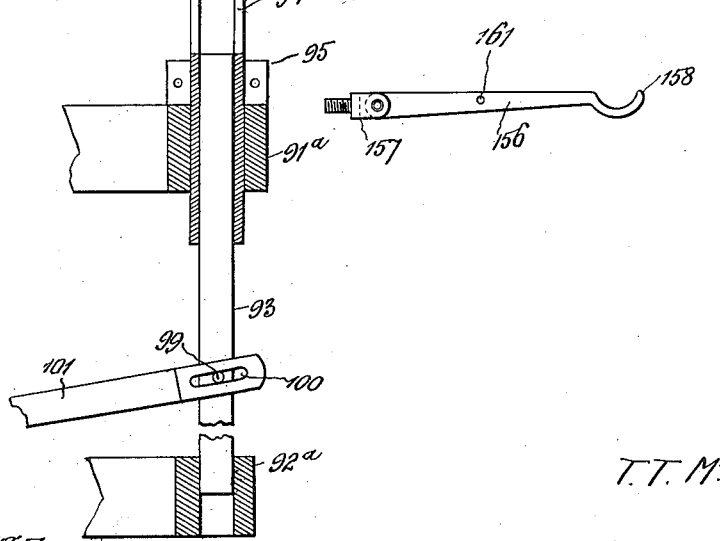

Reference will now be had to the drawings wherein,

Figure 1 is a side elevation of my machine partly broken away and partly in section, Fig. 2 is a front elevation of a knock-off actuating cam, Fig. 3 is a front elevation of the machine, Fig. 4 is a rear elevation of the machine with the balance wheel thereof partly broken away, Fig. 5 is an elevation of an agitator actuating cam wheel, Fig. 6 is an elevation of an agitator lever, Fig. 7 is a plan of a housing and reciprocating head forming part of the machine, Fig. 8 is a front elevation of a detached reciprocating head, Fig. 9 is a cross sectional view taken on the line IX—IX of Fig. 8, Fig. 10 is a vertical sectional view taken on the line X—X of Fig. 8, Fig. 11 is an elevation, partly in section of the upper plunger, Fig. 12 is a perspective view of an adjustable plate detached from the reciprocating head of the machine, Fig. 13 is a similar view of an adjustable bracket for supporting one of the oiling devices of a machine, Fig. 14 is a rear elevation of a cam for intermittently actuating the magazine mold, Fig. 15 is a longitudinal sectional view of the same taken on the line XV of Fig. 14, Fig. 16 is a rear elevation of an internal cam for actuating a magazine lock, Fig. 17 is a longitudinal sectional view of the same, taken on the line XVII of Fig. 16, Fig. 18 is a rear elevation of a cam for actuating a punch forming part of the machine, Fig. 19 is a longitudinal sectional view of the same taken on the line XIX of Fig. 18, Fig. 20 is a rear elevation of a cam for actuating the lower plunger forming part of the machine, Fig. 21 is a longitudinal sectional view taken on the line XXI of Fig. 20, Fig. 22 is an elevation of a portion of one of the oiling devices of the machine, Fig. 23 is a vertical sectional view of the same, Fig. 24 is a plan of a magazine mold, Fig. 25 is a vertical sectional view of the same taken on the line XXV of Fig. 24, Fig. 26 is a plan of a stationary magazine mold holder, Fig. 27 is a vertical sectional view of the same taken on the line XXVII of Fig. 26, Fig. 28 is a bottom plan of the magazine mold, Fig. 29 is an enlarged vertical sectional view of a portion of the machine illustrating the dies coöperating to form plastic material in the magazine mold, Fig. 30 is a plan of a pivoted knock-off used in connection with the machine, Fig. 31 is a horizontal sectional view of a portion of a magazine mold and the holder thereof, Fig. 32 is a plan of a hopper forming part of the magazine mold, Fig. 33 is a plan of a bracket supporting the magazine mold, Fig. 34 is a perspective view of a bolt for adjusting one of the oiling devices, Fig. 35 is a side elevation of a hopper agitating mechanism.

In order that the construction of my machine can be fully understood, the structure and mechanisms will be considered under separate captions and then the general operation of the mechanisms described. The captions are, namely;—a frame work and the shafts carried thereby; a housing and upper die; a magazine mold; the intermittent actuating mechanism of the magazine mold; a lock for the mold; a lower die and the actuating mechanism thereof; a mold hopper and the agitating mechanism; oiling devices used in connection with the magazine mold; and a knock-off and its actuating mechanism.

*The frame work and the shafts carried thereby.*—The frame work comprises two A-frames 1 and 2 having the legs thereof connected by braces 3, and other braces 4 and 5 are used to provide a rigid structure. The upper ends of the frames 1 and 2 are formed with bearings 6 for a longitudinal shaft 7. Upon this shaft adjacent to the frame 2 is secured a large gear wheel 8 meshing with a small gear wheel 9 mounted upon a longitudinal shaft 10, journaled in bearings 11 carried by the frames 1 and 2.

Upon the shaft 10 is mounted a belt wheel 12 whereby the machine can be driven by a belt from a suitable source of power. A balance wheel 13 is mounted upon the rear end of the shaft 10, while the forward end of the shaft protrudes beyond the frame 2, similar to the shaft 7.

Upon the shaft 7 is concentrically mounted a cam 14 having a cam surface 15 for intermittently actuating the magazine mold. The shaft 7 is also provided with an internal cam 16 for actuating the lock of the magazine mold. Another cam 18 is mounted upon the shaft 7 for actuating the lower die, and still another cam 17 is mounted upon the shaft 7 for actuating the punch of the lower die. All of these cams are preferably secured to the shaft 7 by set screws 19 entering a longitudinal groove 20 formed in the shaft 7.

*A housing and the upper die thereof.*— Secured to the upper end of the frame 2 by screw bolts 21 is a housing for the reciprocating head and the upper die of my machine. This housing comprises side plates 22 having confronting flanges 23. Secured to the flanges 23 by screw bolts 24 are vertical guides 25, said guides being slotted, as at 26, for the screw bolts 24. The confronting faces of the guides are provided with vertical V-shaped grooves 27 and the outer faces of said guides are engaged by screw bolts 28 adjustably mounted in the side plates 22 of the housing for adjusting said guides.

Slidably mounted between the guides 25 is a vertically reciprocating head 29 having vertical V-shaped tongues 30 for engaging in the grooves 27. The upper end of the head 29 is provided with alining openings 31 for a pivot bolt 32 upon which is loosely mounted a pitman 33 connecting with a crank 34 upon the forward end of the shaft 7.

The reciprocating head 29 is of a skeleton form and is provided with transverse braces 35 and 36 having vertically alining openings 37 and 38 formed therein. Supported in said openings by nuts 39 and 40 is a vertical screw 41 forming the upper section of the upper die, the lower tubular section 42 of said upper die being secured to the screw 41 by a clamp 43. The upper end of the tubular section 42 is plugged, as at 44, and secured in the lower end of the section 42 by a clamp 45 is an upper die block 46, this die block having a transverse ejector opening 47 and a longitudinal plunger opening 48. The lower end of the block 46 is formed with a depending semi-spherical enlargement 49 adapted to engage plastic material and shape the bottom or lower end of the insulator.

Before further proceeding, it is thought advisable to call attention to the fact that in my machine, the insulators are shaped in an inverted position, as best shown in Fig. 29 of the drawings.

*A magazine mold.*—Adjustably secured to the A frame 2 by nuts and bolts 50 is a bracket 51, said bracket being located beneath the housing of the reciprocating head. This bracket has a large central opening 52 for the depending cylindrical portion 53 of a magazine mold holder 54, said holder being adjustably secured to the bracket by radially disposed set screws 55. Besides the opening 52 the bracket is provided with a vertical lubricant opening 56, and a lower die opening 57, which is angularly disposed with respect to the opening 56. The bracket 51 is provided with a longitudinal groove 59, the purpose of which will hereinafter appear. The holder 54 is adapted to rest upon the bracket and the upper surface of said holder is formed with an annular seat 61 therefor. Centrally of the holder is a socket 62, this socket communicating with the groove 59 of the bracket 51 by a slot 63. The cylindrical portion 53 of the holder is formed with a centrally threaded vertical opening 64 and with a vertical stop opening 65. The holder is formed with another opening 66 adapted to aline with the lubricant opening 56 of the bracket 51. The holder is provided with still another opening 67 adapted to aline with the die opening 57 of the bracket 51.

Revolubly mounted upon the seat 61 of the holder is a cylindrical magazine mold 68 having circumferentially disposed vertical openings 69 adapted to receive the plastic material to be shaped in said mold. The upper face of the mold is formed with a central circular enlargement 70 and the lower face with a central depending enlargement 71 and this enlargement together with the mold body are provided with a vertical opening 72 adapted to aline with the interiorly threaded opening 64 of the magazine mold holder.

The depending enlargement 71 of the mold which extends into the socket 62 is provided with ratchet teeth 73, and the lower face of the mold surrounding said enlargement is formed with circumferentially disposed tapering stop pin recesses 74.

The mold 68 is revolubly supported upon the holder by a tie bolt 75 which extends through the opening 72 of the mold and has the lower end thereof contracted and threaded to enter the interiorly threaded opening 64 of the holder, said bolt being locked by a nut 76 screwed upon the lower end thereof.

*The intermittent actuating mechanism of the magazine mold.*—Extending through a groove 59 of the bracket 51 into the slot 63 of the holder is a rod 77 having the inner end thereof formed to provide a resilient tooth 78 adapted to engage the ratchet teeth 73 of the mold 68. The rod 77 extends through the A-frame 2, and is pivotally connected, as at 79, to an arm 80, fulcrumed as at 81 upon a depending bracket 82, carried by the longitudinal brace 5. The upper end of the arm 80 is contracted and provided with a roller 83 for engaging the cam 14 mounted upon the shaft 7.

The rod 77 adjacent to the A-frame 2 is provided with an adjustable collar 84 and encircling said rod between said collar and the A-frame is a coil spring 85, this coil spring forcing rearwardly upon the rod 77, whereby after the arm 80 is given an impulse by the cam surface 15 of the cam 14, said arm and lever will be returned to their normal position allowing the tooth 78 to engage another ratchet tooth 73. It is obvious that when the shaft 7 is revolved that an intermittent movement will be imparted to the magazine mold.

*A lock for the magazine mold.*—Upon the rear side of the A-frame 2 directly behind the bracket 51 is located a bracket 86 and fulcrumed upon this bracket is a lever 87 extending through the A-frame. Secured to the forward end of the lever 87 is a vertical stop pin 88 adapted to extend upwardly into the opening 65 of the magazine holder and engage in one of the recesses 74 of the magazine mold.

The rear end of the lever 87 is pivotally connected, as at 89, to a vertical rod 90, said rod having the upper end thereof provided with a head 88$^a$ guided by a bracket 89$^a$ carried by the brace 5. Secured to the head 88 is a revoluble roller 90$^a$ adapted to engage in the internal cam 16 mounted upon the shaft 7. Secured to the rod is a collar 91 and encircling said rod between said collar and the brace 5 is a coil spring 92, the tension of said coil spring normally maintaining the roller 90$^a$ in engagement with the cam surface of the internal cam 16. As the shaft 7 is revolved, the internal cam 16 is adapted to intermittently move the locking pin 88, said pin engaging in one of the recesses 74 when one of the openings 69 of the magazine mold alines with the opening 67 of the mold holder.

*The lower die and the actuating mechanism thereof.*—Secured to the forward side of the A-frame 2 are two guide brackets 91$^a$ and 92$^a$ for a sectional lower die, comprising a section 93 secured to a tubular section 94 by a clamp 95. The tubular section 94 is provided with longitudinal slots 96 and secured in the upper end of said section is a die block 97 having a central punch opening 98 adapted to vertically aline with the punch opening 48 of the upper die block 46. The upper end of the die block 97 is provided with an annular recess 98$^a$ for shaping plastic material to conform to the upper end of an insulator.

The lower section 93 of the lower die is provided with a pin 99 extending into a slot 100 formed in the end of a lever 101, fulcrumed upon a bracket 102, carried by the rear side of the A-frame 2. The rear end of the lever 101 is pivotally connected, as at 103 to a vertical rod 104, the upper end of said rod having a bearing 105 for a revoluble roller 106. This roller is engaged by the cam 18 mounted upon the shaft 7, and is normally supported in an elevated position by a coil spring 107 encircling the rod 104 between the brace 4 and a collar 108 mounted upon said rod.

When the cam 18 engages the roller 106, the coil spring 107 is placed under tension and the forward end of the lever 101 is raised to move the lower die into one of the openings 69 of the magazine mold. When the cam 18 releases the revoluble roller 106, the rod 104, lever 101 and the lower plunger immediately assume their normal positions, said rod being elevated by the spring 107 and guided by the braces 4 and 5.

Located in the tubular section 94 of the lower mold is a vertical punch 109, said punch being adapted to enter the punch opening 98 of the die block 97 and the punch opening 48 of the die block 46, said punch also passing through plastic material confined within one of the openings 69 of the die block. This punch provides the shaped plastic material with the central opening ordinarily used when securing a completed insulator to a suitable support.

The lower end of the punch 109 is connected to a lever 110 and this lever is fulcrumed upon the pivot pin 111 of the bracket 86 employed for holding the lever 87 heretofore referred to. The rear end of the lever 110 is pivotally connected, as at 112, to a vertical rod 113 guided in the braces 4 and 5. The upper end of this rod is provided with a bearing 114 for a revoluble roller 115 adapted to be engaged by the cam 17 mounted upon the shaft 7. The rod 113 is normally supported at an elevated position by a coil spring 116 encircling said rod between the brace 4 and the collar 117 mounted upon said rod.

The slots 96 provide free movement for the forward end of the lever 110, and when the cam 17 of the shaft 7 impinges the revoluble roller 115, the rod 113 will be lowered placing the spring 116 under tension. After lowering the rod 113, the punch 109 is elevated to provide the plastic material confined within the opening 69 of the mold with a central opening, the plastic material removed by the punch being forced upwardly through the punch opening 48 of the die block 46 and ejected from the opening 47 of said die block. Upon the cam 17 of the shaft 7 releasing the revoluble roller 115, the coil spring 116 immediately returns the rod 113 to its elevated and normal position, with the punch 109 lowered in the die block 97.

*A mold hopper and the agitating mechanism.*—Loosely mounted upon the magazine mold 68 and surrounding the enlargement 70 thereof is a hopper 118, this hopper having an opening 119 of a larger area than the upper ends of three of the openings 69 of the mold. In connection with this hopper, a metallic chute 120 can be used (shown in dotted lines of Fig. 32) whereby material can be easily placed in the hopper to enter the openings 69.

The hopper 118 is provided with a radial arm 121 and pivotally connected to said arm is a slotted link 122, said link being loosely mounted upon a pin 123, carried by a bracket 124 secured to the forward side of the A frame 2.

Above the bracket 124 and at one side of the reciprocating head 29 is located another bracket 125, said bracket being carried by the forward side of the A frame 2. Fulcrumed in this bracket 125 is a curved lever 126 having the lower end thereof loosely mounted in an opening 127 formed in the link 122. The upper end of the lever 126 is provided with a revoluble roller 128 adapted to engage in a cam groove 129 formed in a cam wheel 130 mounted upon the forward end of the shaft 10.

When the shaft 10 is revolved, the lever 126 is rocked, and the link 122 oscillated to vibrate the hopper 118, whereby the plastic material in the hopper will be fed into the openings 69 beneath said hopper.

*Oiling devices used in connection with the magazine mold.*—The first oiling device is used in connection with the upper die. The tubular section 42 of the upper die is provided with an elbow connection 131 supporting a cock 132 and this cock supports a lubricant receptacle 133. The cock 132 is regulated to allow a certain amount of lubricant to enter the tubular section 42, and from this tubular section 42, the lubricant is adapted to flow by gravity into the punch openings 48 and 98 of the die blocks 46 and 97 respectively. The lubricant insures easy and uninterrupted movement of the punch 109 in the die blocks 46 and 97. The other oiling device comprises a lubricant fed swab for cleaning and oiling the openings 69 of the magazine mold, whereby said openings can be easily filled from the hopper 118 and the plastic material compressed and the shaped material ejected from the mold. The swab comprises a tube 134 having the lower end thereof interiorly threaded for a plug 135, the lower end of said plug being enlarged, as at 136 and provided with an annular flared shoulder 137, for supporting packing or swabbing material 138. The enlargement 136 is provided with flat faces 139 permitting of a wrench or similar instrument being used for screwing the plug 135 in the tube 134. Prior to placing the plug in the tube 134, a washer 140 is placed in engagement with the end of the tube, said washer having an annular flared end 141 coöperative with the shoulder 137 of the plug for holding the packing or swabbing material 138.

The plug 135 is provided with a central bore 142 communicating with a plurality of radially disposed ports 143 formed in said plug, whereby a lubricant within the tube 134 can pass into the packing and swabbing material 138.

The upper end of the tube 134 is secured in an adjustable bracket 144 which together with an adjustable plate 145 is secured to the transverse brace 35 of the reciprocating head 29. The bracket 144 is longitudinally slotted as at 146 and extending through said slot and openings 147 formed in the plate 145, are screw bolts 148, these bolts being adjustably mounted in openings 149 provided therefor in the brace 35.

The adjustable plate 145 is provided with two interiorly threaded openings 150 for set screws 151, these set screws engaging the brace 35 of a reciprocating head 29. By loosening the screw bolts 148, and adjusting the set screws 151, the bracket 144 can be laterally adjusted to correctly position the swab above the openings 69 of the magazine mold, whereby when the head 29 is reciprocated, said swab will be moved in and out of the openings 69.

The upper end of the tube 134 is provided with a cock 154 supporting a lubricant receptacle 155. The flow of a lubricant from this receptacle into the tube 134 is controlled by the cock 154.

*A knock-off and its actuating mechanism.*—In connection with the machine, I use a knock-off device for moving the molded material when raised from the mold 68, this knock-off device comprising an arm 156 pivotally mounted upon an eye-bolt 157 carried by the forward side of the A frame. The outer end of the arm 156 is curved as at 158, to embrace and engage the molded product as the same is elevated from the mold. To hold the arm 156 whereby it will not interfere with the die during the movement of the same, I use a mechanism comprising a lever 159 fulcrumed upon the bracket 160, carried by the forward side of the A frame. The lower end of this lever extends into an opening 161 provided therefor in the knock-off arm 156, while the upper end of said lever is pivotally connected as at 162 to a plunger 163 slidably mounted in a bearing 164 secured to the inner and longitudinal side of the A frame 2. The rear end of the plunger 163 is bifurcated, as at 165 for a revoluble roller 166, this roller engaging a cam wheel 167 mounted upon the hub 168 of the large gear wheel 8. The revoluble roller 166 is normally retained in engagement with the cam wheel 167 by a coil spring 169 encircling the plunger 163 between the bifurcation thereof and the bearing 164.

Since the arm 156, (see Fig. 30) is pivoted to the A frame 2 at one side of the upper die, it is obvious that a longitudinal movement of the plunger 163 will through the medium of the lever 159 swing the knock-off arm to remove the insulation as the same is elevated above the mold.

Operation: Assuming that power is transmitted to the shaft 10 through the medium of the belt wheel 12, the gear wheels 8 and 9 will impart a rotary movement to the longitudinal shaft 7, and this shaft through the medium of the crank 34 and pitman 33 will vertically reciprocate the head 29 carrying the upper die.

Simultaneous with the reciprocating of the upper die the lower die is reciprocated by the cam 18 and these dies carrying the die blocks 46 and 97 are adapted to simultaneously enter one of the openings 69 of the magazine mold 68. The lower die in a lowered position remains in the die opening 67 of a mold holder, and as the openings 69 are fed from the hopper 118, the plastic material is retained in said openings by the mold holder. After one of the filled openings alines with the opening 67 of the holder, the punch 109 is elevated through the medium of the lever 110, rod 113 and cam 17 for providing the material (unpressed) with a central vertical opening. The dies are then simultaneously actuated to press the material surrounding the punch, and after the material has been given sufficient pressure, the upper die recedes followed by an elevation of the lower die, whereby the finished product can be knocked-off of the lower die by the knock-off arm 156. It will of course be understood that the upper die raises sufficiently to permit of the finished product being easily removed. The punch 109 is adapted to recede with the lower die, until the die block 97 and the upper end of the punch are within the opening 67 of the magazine holder. The mold is now moved to present another filled opening for compression, this being accomplished through the intermittently actuated mechanism operated by the cam 14 located on shaft 7.

It is thought that the operation of agitating the contents of the hopper 118 will be understood, also the operation and utility of the oiling devices and the knock-off device. It is apparent that easy access can be had to each and every part of my machine and that the parts are compactly arranged, whereby the machine will occupy a comparatively small space.

I would have it understood that my machine can be used for molding other products than insulators, this being accomplished by changing the die blocks 46 and 97 and adjusting the upper die whereby articles of various depths can be molded.

While in the drawings forming a part of this application there is illustrated the preferred embodiments of my invention, it is to be understood that the elements therein can be varied or changed as to shape, proportion and manner of assemblage without departing from the spirit of the invention.

Having now described my invention, what I claim as new, is;—

1. An insulator pressing machine embodying A frames, braces connecting said frames, longitudinal shafts revolubly mounted in said frames and adapted to be simultaneously revolved, a reciprocating head supported by one of said frames and adapted to be reciprocated by one of said shafts, an upper adjustable die carried by said head and comprising a tubular section and a die block carried by said section, a lower die movably supported by one of said frames and adapted to be reciprocated by one of said shafts, said lower die comprising a tubular section and a die block carried thereby, a bracket carried by one of said frames beneath said reciprocating head, said bracket having an opening formed therein for said lower die, a stationary mold holder mounted upon said bracket and having an opening formed therein adapted to register with the opening of said bracket, a magazine mold revolubly mounted upon said holder and having a plurality of circumferentially disposed vertical openings formed therein adapted to receive said dies, said holder having an opening formed therein adapted to register with said mold openings, means actuated by one of said shafts for intermittently moving said mold, said means including a tooth for engaging said mold, a spring held rod for moving said tooth, a fulcrumed lever for moving said rod, and a cam for actuating said lever; a hopper movably mounted upon said mold and adapted to register with a plurality of the openings thereof, means supported by said frame and actuated by one of said shafts for vibrating said hopper, a punch located in the lower die, means actuated by one of said shafts for moving said punch into the die blocks of said dies, a knock-off arm carried by one of said frames and actuated by one of said shafts for removing the product from the lower die, a swabbing device adjustably carried by said reciprocating head and actuated by one of said shafts for swabbing vertical openings of said mold, an oiling device carried by said upper die for supplying a lubricant to said punch, and means carried by one of said frames and actuated by one of said shafts for locking said mold during the movement of said dies therein, substantially as described.

2. An insulator pressing machine embodying A frames, longitudinal shafts revolubly mounted in said frames and adapted to be simultaneously revolved, a reciprocating head supported by one of said frames and adapted to be reciprocated by one of said shafts, an upper adjustable die carried by said head and comprising a tubular section and a die block carried by said section, a lower die movably supported by one of said frames and adapted to be reciprocated by one of said shafts, said lower die comprising a tubular section and a die block carried thereby, a bracket carried by one of said frames beneath said reciprocating head, said bracket having an opening formed therein for said lower die, a stationary mold holder mounted upon said bracket and having an opening formed therein adapted to register with the opening of said bracket, a magazine mold revolubly mounted upon said holder and having a plurality of circumferentially disposed vertical openings formed therein adapted to receive said dies, said holder having an opening formed therein adapted to register with said mold openings, means actuated by one of said shafts for intermittently moving said mold, a hopper movably mounted upon said mold and adapted to register with a plurality of the openings thereof, means supported by said frame and actuated by one of said shafts for vibrating said hopper, a punch located in the lower die, means actuated by one of said shafts for moving said punch into the punch blocks of said dies, a knock-off arm carried by one of said frames and actuated by one of said shafts for removing the product from the lower die, a swabbing device adjustably carried by said reciprocating head and actuated by one of said shafts for swabbing vertical openings of said mold, an oiling device carried by said upper die for supplying a lubricant to said punch, and means carried by one of said frames and actuated by one of said shafts for locking said mold during the movement of said dies therein, substantially as described.

3. An insulator pressing machine embodying a frame, a driven shaft carried by said frame, a reciprocating head supported by said frame and adapted to be reciprocated by said shaft, an upper adjustable die carried by said head, a lower die movably supported by said frame and adapted to be reciprocated by said shaft, die blocks carried by the confronting ends of said dies, a bracket carried by said frame beneath said reciprocating head, said bracket having an opening formed therein for said lower die, a stationary mold holder mounted upon said bracket and having an opening formed therein adapted to register with the opening of said bracket, a magazine mold revolubly mounted upon said holder and having a plurality of circumferentially disposed vertical openings formed therein adapted to receive said dies, means actuated by said shaft for intermittently moving said mold, said means including a ratchet and cam mechanism, a hopper movably mounted upon said mold and adapted to register with the plurality of openings thereof, means actuated by said shaft for vibrating said hopper, a punch arranged in the lower die and adapted to enter said die blocks, means actuated by said shaft for moving said punch, means for locking said mold during the movement of said dies within said mold, a swabbing device carried by said reciprocating head for cleansing the openings of said mold, an oil receptacle carried by said reciprocating head for lubricating said punch, and a knock-off arm carried by said frame for removing the product from the lower die.

4. An insulator pressing machine embodying a frame, a driven shaft carried by said frame, a reciprocating head supported by said frame and adapted to be reciprocated by said shaft, an upper adjustable die carried by said head, a lower die movably supported by said frame and adapted to be reciprocated by said shaft, a bracket carried by said frame beneath said reciprocating head, said bracket having an opening formed therein for said lower die, a stationary mold holder mounted upon said bracket and having an opening formed therein adapted to register with the opening of said bracket, a magazine mold revolubly mounted upon said holder and having a plurality of circumferentially disposed vertical openings formed therein adapted to receive said dies, means actuated by said shaft for intermittently moving said mold, a hopper movably mounted upon said mold and adapted to register with the plurality of openings thereof, means actuated by said shaft for vibrating said hopper, a punch arranged in the lower die and adapted to enter said mold, means actuated by said shaft for moving said punch, means for locking said mold during the movement of said dies within said mold, a swabbing device carried by said reciprocating head for cleansing the openings of said mold, an oil receptacle carried by said reciprocating head for lubricating said punch, and a knock-off arm carried by said frame for removing the product from the upper die.

5. An insulator pressing machine embodying a frame, a driven shaft carried by said frame, a reciprocating head supported by said frame and adapted to be reciprocated by said shaft, an upper adjustable die carried by said head, a lower die movably supported by said frame and adapted to be reciprocated by said shaft, a bracket carried by said frame beneath said reciprocating head, said bracket having an opening formed therein for said lower die, a stationary mold holder mounted upon said bracket and having an opening formed therein adapted to register with the opening of said bracket, a magazine mold revolubly mounted upon said holder and having a plurality of circumferentially disposed vertical openings formed therein adapted to receive said dies, means actuated by said shaft for intermittently moving said mold, a hopper movably mounted upon said mold and adapted to register with the plurality of openings thereof, means actuated by said shaft for vibrating said hopper, a punch arranged in the lower die and adapted to enter said mold, means actuated by said shaft for moving said punch, means for locking said mold during the movement of said dies mold within said mold, a swabbing device carried by said reciprocating head for cleansing the openings of said mold, and a knock-off arm carried by said frame for removing the product from the lower die.

6. An insulator pressing machine embodying a frame, a driven shaft carried by said frame, a reciprocating head supported by said frame and adapted to be reciprocated by said shaft, an upper adjustable die carried by said head, a lower die movably supported by said frame and adapted to be reciprocated by said shaft, a bracket carried by said frame beneath said reciprocating head, said bracket having an opening formed therein for said lower die, a stationary mold holder mounted upon said bracket and having an opening formed therein adapted to register with the opening of said bracket, a magazine mold revolubly mounted upon said holder and having a plurality of circumferentially disposed vertical openings formed therein adapted to receive said dies, means actuated by said shaft for intermittently moving said mold, a hopper movably mounted upon said mold and adapted to register with the plurality of openings thereof, means actuated by said shaft for vibrating said hopper, a punch arranged in the lower die and adapted to enter said dies when said dies are located in said mold, means actuated by said shaft for moving said punch, means for locking said mold during the movement of said dies within said mold, and a swabbing device carried by said reciprocating head for cleansing the openings of said mold.

7. An insulator pressing machine embodying a frame, a driven shaft carried by said frame, a head supported by said frame and reciprocated by said shaft, an adjustable die carried by said head, a die movably supported by said frame and adapted to be reciprocated by said shaft, a stationary mold holder carried by said frame and having an opening formed therein for the last mentioned die, a magazine mold revolubly mounted upon said holder and having a plurality of circumferentially disposed vertical openings formed therein adapted to receive said dies, means actuated by shaft for intermittently moving said mold, a hopper movably mounted upon said mold, means actuated by said shaft for vibrating said hopper, a punch arranged in the last mentioned die and actuated by said shaft independent of said die, means for locking said mold during the movement of said dies within said mold, a swabbing device carried by said reciprocating head for cleansing the openings of said mold, an oil receptacle carried by said reciprocating head for lubricating said punch, and a knock-off arm carried by said frame for removing the product from the lower die.

8. An insulator pressing machine embodying a frame, a driven shaft carried by said frame, a head supported by said frame and reciprocated by said shaft an adjustable die carried by said head, a die movably supported by said frame and adapted to be reciprocated by said shaft, a stationary mold holder carried by said frame and having an opening formed therein for the last mentioned die, a magazine mold revolubly mounted upon said holder and having a plurality of circumferentially disposed vertical openings formed therein adapted to receive said dies, means actuated by said shaft for intermittently moving said mold, a hopper movably mounted upon said mold, means actuated by said shaft for vibrating said hopper, a punch arranged in the last mentioned die and actuated by said shaft independent of said die, means actuated for locking said mold during the movement of said dies within said mold, a swabbing device carried by said reciprocating head for cleansing the openings of said mold, and a knock-off arm carried by said frame for removing the product from the lower die.

9. An insulator pressing machine embodying a frame, a driven shaft carried by said frame, a head supported by said frame and reciprocated by said shaft, an adjustable die carried by said head, a die movably supported by said frame and adapted to be reciprocated by said shaft, a stationary mold holder carried by said frame and having an opening formed therein for the last mentioned die, a magazine mold revolubly mounted upon said holder and having a plurality of circumferentially disposed vertical openings formed therein adapted to receive said dies, means actuated by said shaft for intermittently moving said mold, a hopper movably mounted upon said mold, means actuated by said shaft for vibrating said hopper, a punch arranged in the last mentioned die and actuated by said shaft independent of said die, means actuated for locking said mold during the movement of said dies within said mold, and a swabbing device carried by said reciprocating head for cleansing the openings of said mold.

10. An insulator pressing machine embodying a frame, a driven shaft carried by said frame, a head supported by said frame and reciprocated by said shaft, an adjustable die carried by said head, a die movably supported by said frame and adapted to be reciprocated by said shaft, a stationary mold holder carried by said frame and having an opening formed therein for the last mentioned die, a magazine mold revolubly mounted upon said holder and having a plurality of circumferentially disposed vertical openings formed therein adapted to receive said dies, means actuated by said shaft for intermittently moving said mold, a punch arranged in the last mentioned die and actuated by said shaft independent of said die, and a swabbing device carried by said reciprocating head for cleansing the openings of said mold.

11. An insulator pressing machine embodying a frame, a driven shaft carried by said frame, a head supported by said frame and reciprocated by said shaft, an adjustable die carried by said head, a die movably supported by said frame and adapted to be reciprocated by said shaft, a stationary mold holder carried by said frame and having an opening formed therein for the last mentioned die, a magazine mold revolubly mounted upon said holder and having a plurality of circumferentially disposed vertical openings formed therein adapted to receive said dies, means actuated by said shaft for intermittently moving said mold, a punch arranged in the last mentioned die and actuated by said shaft independent of said die, and a swabbing device carried by said reciprocating head for cleansing the openings of said mold.

12. An insulator pressing machine embodying a frame, a driven shaft, a head supported by said frame and reciprocated by said shaft, an adjustable die carried by said head, a die movably supported by said frame and adapted to be reciprocated by said shaft, a magazine mold revolubly supported by said frame and having a plurality of vertical openings formed therein adapted to receive said dies, means actuated by said shaft for intermittently moving said mold, a punch arranged in one of said dies and actuated by said shaft to extend into the other of said dies when said dies are located in said mold, means actuated for locking said mold during the movement of said dies within said mold, and a swabbing device carried by said head for cleansing the openings of said mold.

13. A pressing machine embodying a frame, a driven shaft, reciprocating dies operated by said shaft, a revoluble magazine mold supported by said frame and having openings therein to receive said dies, a punch arranged in one of said dies, a swabbing device attached to the die for cleaning one mold opening while the die to which the swabbing device is attached operates in another mold opening, means actuated by said shaft for intermittently moving said mold, and means for temporarily holding said mold during the movement of said dies therein.

14. A pressing machine embodying a frame, a driven shaft, reciprocating dies operated by said shaft, a revoluble magazine mold supported by said frame and having openings therein to receive said dies, a punch arranged in one of said dies, a swabbing device attached to the die for cleaning one mold opening while the die to which the swabbing device is attached operates in another mold opening, and means actuated by said shaft for intermittently moving said mold.

15. A machine of the type described comprising a frame, a driven shaft, vertical reciprocating dies operated by said shaft, a revoluble magazine mold adapted to receive said dies, a swabbing device attached to a die and acting upon one mold opening while the die to which it is attached operates in another mold opening, means operated by said shaft for intermittently moving said mold, and means for holding said mold during the movement of said dies therein.

16. A machine of the type described comprising a frame, a driven shaft, vertical reciprocating dies operated by said shaft, a revoluble magazine mold adapted to receive said dies, a swabbing device attached to a die and acting upon one mold opening while the die to which it is attached operates in another mold opening, and means operated by said shaft for intermittently moving said mold.

17. A machine of the type described comprising an intermittently moving magazine mold, reciprocatory dies adapted to enter said mold, a swabbing device attached to a die and acting upon one mold opening while the die to which it is attached operates in another mold opening, means for temporarily holding said mold during the movement of said dies therein, and a vibratory hopper for feeding material into said mold.

18. A machine of the type described comprising an intermittently moving magazine mold, reciprocatory dies adapted to enter said mold, a swabbing device attached to a die and acting upon one mold opening while the die to which it is attached operates in another mold opening, and means for temporarily holding said mold during the movement of said dies therein.

19. A pressing machine comprising an intermittently moving magazine mold, reciprocatory dies adapted to enter said mold, a swabbing device attached to a die in acting upon one mold opening while the die to which a device is attached operates in another mold opening, and means for locking said mold during the movement of said dies therein.

20. A pressing machine comprising an intermittently moving magazine mold, reciprocatory dies adapted to enter said mold, and a swabbing device attached to a die in acting upon one mold opening while the die to which a device is attached operates in another mold opening.

In testimony whereof I affix my signature in the presence of two witnesses.

THOMAS TUCKER McCANN.

Witnesses:
MAX H. SROLOVITZ,
A. T. TRIGG.